Jan. 17, 1967  M. D. NELSON, JR  3,298,949
TREATING NATURAL GAS STREAMS
Filed Oct. 21, 1963
FIG. 1
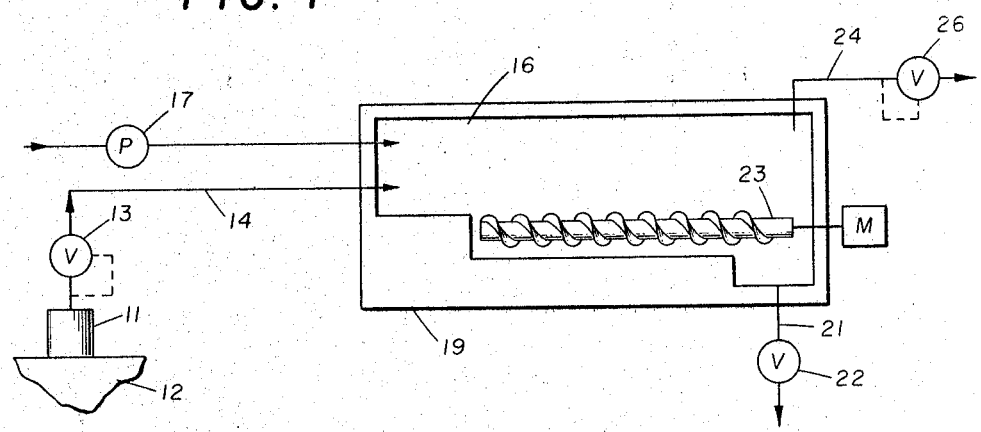
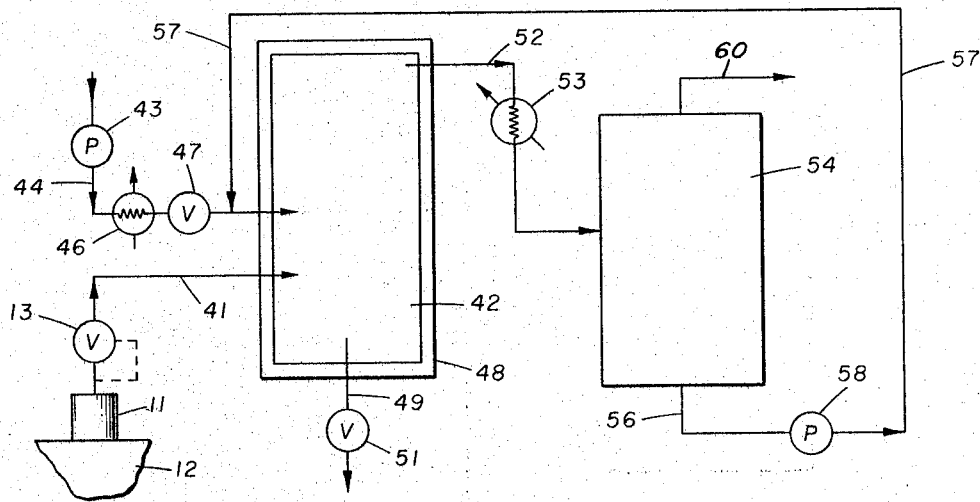
FIG. 2
MURRELL D. NELSON, JR.
INVENTOR.
BY *Emil J. Bednar*
ATTORNEY United States Patent Office 3,298,949
Patented Jan. 17, 1967

3,298,949
TREATING NATURAL GAS STREAMS
Murrell D. Nelson, Jr., Arlington, Tex., assignor to Mobil Oil Corporation, a corporation of New York
Filed Oct. 21, 1963, Ser. No. 317,708
4 Claims. (Cl. 208—340)

This invention relates to the treatment of natural gas streams, and more particularly to the treatment of high pressure natural gas streams containing large amounts of carbon dioxide.

The increasing need for natural gas has led to the exploitation of many gas reservoirs found throughout the world. Gas reserves have been found which produce a fluid with such high concentrations of carbon dioxide so as to be economically undesirable as sources of natural gas. For example, some reservoirs are capable of commercial production but have carbon dioxide contents as high as 52 percent. Favorably, the gas is available from these sources at relatively high pressures so as to be economically transported in pipelines. For example, the pressures may be in the range of 2500 pounds per square inch. One example of such carbon dioxide-contaminated natural gas is that produced in the Brown-Bassett Field in Southwest Texas. The carbon dioxide content in such high pressure fluids must be reduced as much as possible to provide a suitable gas for dispensing commercially at an optimum sales value. At the present time, these high pressure natural gas streams are not commercialized to an optimum economic advantage because of the expense involved in reducing the carbon dioxide content to an acceptable value by known procedures. Generally, such value may be considered to be in the range of about 2 to 5 percent of carbon dioxide in the natural gas.

This invention is a process for reducing the carbon dioxide content in such high pressure fluids to provide a more valuable natural gas stream which may be readily sold without the price handicaps heretofore imposed upon it. This reduction of carbon dioxide content in natural gas is the principal object of the present invention. A further object is to provide valuable by-products from this process for reducing the amount of carbon dioxide in high pressure natural gas.

These and further objects will be more apparent when read in conjunction with the following detailed description of the present invention, the appended claims, and the attached drawings wherein:

FIGURE 1 is a diagrammatic flow diagram of a preferred process embodying the present invention, and FIGURE 2 is a diagrammatic flow diagram of a second embodiment of the process of this invention.

The objects of the present invention are obtained by a process for reducing the amount of carbon dioxide in natural gas which includes the following steps. As a first step, a high pressure natural gas stream containing carbon dioxide is intermixed with ammonia. Next, the mixture of ammonia and the high pressure natural gas is subjected to suitable reaction conditions for forming solid materials from the reaction of ammonia with carbon dioxide and, lastly, the solid materials are separated from the natural gas stream to provide a natural gas stream with a reduced carbon dioxide content.

Referring now to FIGURE 1 of the drawings, a first embodiment of the present invention will be described. This embodiment is preferred since it may be used as a "once-through" process for removing carbon dioxide. A high-pressure natural gas stream to be treated may be obtained from any source producing a fluid having an undesirably high carbon dioxide content from an economic or other viewpoint. For example, the natural gas stream may be taken from a suitable gas reservoir through a well 11 disposed in the earth 12 and provided with a pressure control valve 13 to regulate the supply of the natural gas. For example, the natural gas stream may be taken from the Brown-Bassett Field heretofore described. A suitable natural gas stream pressure may be 2500 p.s.i. However, any pressure above one atmosphere may be used. The natural gas stream may be regulated as to pressure by any means such as provided by the pressure control valve 13 and thence flows through a conduit 14 into a reaction chamber 16. Ammonia from any suitable source, such as liquid ammonia, is provided under a similar pressure by any means, such as by a pump 17, to flow through a conduit 18 into the reaction chamber 16. The ammonia is intermixed with the high pressure natural gas from the well 11 on entry into the reaction chamber 16. The ammonia and natural gas may, if desired, be mixed in any suitable mixing means prior to introduction into the reaction chamber 16. The ammonia may be introduced either as a gas, or as a liquid, into the reaction chamber 16.

Suitable reaction conditions are maintained in the reaction chamber 16 for forming solid materials from the reaction of ammonia with the carbon dioxide in the natural gas stream from the well 11. Such conditions include a suitable temperature, for example, at least about 130° C., and contact at the temperature and at elevated pressure for a sufficient length of time that the solid materials are formed. These solid materials include ammonium carbamate, urea, and other solids formed by the reaction of ammonia with the carbon dioxide and other reactants in the natural gas stream. Thus, the reaction conditions may be those well known for producing urea from carbon dioxide and ammonia. The term "solid materials" is used herein to denote the reaction products of ammonia and carbon dioxide which usually are solids but which also may form in solution. One means for maintaining a desired temperature in the reaction chamber 16 may be by providing a surrounding fluid jacket 19 through which is circulated a suitable heat-exchanging fluid. Although temperatures somewhat less than 130° C. may be used in the reaction chamber 16, it is preferred to use at least about this temperature in order to maintain the solid materials formed by the desired reaction in a more fluid state to facilitate their handling. Where the solid materials are in a sufficient fluid state to flow readily, they will descend to the lower extremities of the reaction chamber 16. The solid materials may be removed from a sump formed in the reaction chamber 16 through an effluent conduit 21 through which flow is controlled by means of a valve 22. Where the temperature within the reaction chamber 16 is less than this indicated temperature, a power-driven conveyor means 23 may be utilized to move the solid materials along the bottom of the reaction chamber 16 into a position where they can be removed through effluent conduit 21. Other means may be used for removing the solid materials from the natural gas in the reaction chamber 16, if desired. For example, the sump of the reaction chamber 16 may be filled with oil to provide a vehicle for occluding and carrying the solid materials.

The pressure within the reaction chamber 16 is preferably maintained at a total partial pressure of the ammonia and the carbon dioxide above the dissociation pressure of ammonium carbamate which, for example, is one atmosphere at 60° C. and seven atmospheres at 100° C. This generally is no problem because the high pressure natural gas is usually much above this pressure. If not, auxiliary compressing means may be used if desired. Preferably, the pressure within the reaction chamber 16 is maintained at as high a value as possible and usually will be only slightly less than that available at the well 11 in the natural gas stream if the process is practiced at the well 11. Inasmuch as various nonreactants decrease the reaction rates and quantities of solid materials formed by the reaction of ammonia with the carbon dioxide, it is preferred to maintain the reaction conditions at increased values, for example a temperature as high as between about 200° to 210° C., and a pressure as high a value as can be readily obtained. The nonreactants may be considered to include water, oxygen, sulfur, and inert gases all of which require a higher temperature and pressure for a given degree of equilibrium conversion in forming the solid materials.

It is desirable to maintain an excess of ammonia in the reaction chamber 16. Although it is possible to obtain satisfactory results with 2 mols of ammonia for each mol of carbon dioxide in the natural gas, it is preferred to maintain an excess of 3 to 5 mols of ammonia with respect to each mol of carbon dioxide to facilitate removing as great an amount of carbon dioxide as possible.

The "once-through" process is readily used to great advantage since there is a large supply of carbon dioxide in the high pressure natural gas which favors solid materials rich in urea, a valuable organic substance. Generally, the carbon dioxide content can be reduced in a "once-through" process in the reaction chamber 16 to a value acceptable commercially. If desired, a series of the reaction chambers 16 may be used to reduce the carbon dioxide to any satisfactory content if a single reaction chamber 16 does not produce the desired result. Generally, the carbon dioxide content of the natural gas need not be reduced to less than between 2 and 5 percent.

The reaction chamber 16 also provides for separating the carbon dioxide-freed natural gas stream through a conduit 24 in which flow may be controlled by a back pressure valve 26. In view of the somewhat corrosive nature of the materials formed by the reaction in the reaction chamber 16, it may be desirable to use a protective coating, such as lead, within the reaction chamber 16. The ammonia remaining in the natural gas in the conduit 24 may be recovered by any usable means, if desired. For example, the natural gas may be scrubbed with sulfuric acid to produce ammonium sulfate and an ammonia-freed natural gas. Furthermore, any unreacted carbon dioxide and excess ammonia may be separated from the solid materials being removed from the reaction chamber 16 through the conduit 21 and recycled to the reaction chamber 16 for further reaction. One means to separate these gases from the solid materials is by applying heat.

From the foregoing it will be apparent that the elevated pressure of the natural gas from the well 11 is used to advantage along with its elevated temperatures to foster the reaction with ammonia in the reaction chamber 16. A "once-through" process is readily utilized since the natural gas contains a sufficient supply of carbon dioxide to favor complete reaction with ammonia and other uses may be made of any unreacted ammonia. Additionally, the products of the reaction, as substantially solid materials removed through the effluent conduit 21, include a mixture of ammonia carbamate, urea, ammonia, and water. All of these materials are valuable substances, especially as fertilizers. Thus, the present invention in the described procedure not only removes the carbon dioxide from high pressure natural gas to provide a more commercially desirable natural gas, but also produces valuable by-products.

A second embodiment is shown in FIGURE 2 which provides for the recycling of ammonia. A source of high pressure natural gas containing carbon dioxide is provided and may be the same as described for the procedure relating to FIGURE 1. Such source of gas will not be further mentioned relative to this embodiment but will be referred to as being the same as previously described. The high pressure natural gas from the well 11 is conveyed through a conduit 41 into a reaction chamber 42 which may be provided with a suitable corrosion-resistant lining, if desired. A source of ammonia is connected to the reaction chamber 42 by means of a pump 43 and a conduit 44. The desired mixture of ammonia and natural gas is obtained in the reaction chamber 42, as previously described. The ammonia may be a liquid or a gas in the conduit 44 and may be passed through a heat exchanger 46 and a check valve 47 into the reaction chamber 42. Suitable reaction conditions are provided in the reaction chamber 42, which conditions are the same as have been described relative to the embodiment shown in FIGURE 1. A jacket 48 may be provided about the reaction chamber 42 to permit applying a heat-transferring medium for adjusting the temperature therein. The solid materials produced by the reaction between the ammonia and the carbon dioxide in the natural gas mixture within the reaction chamber 42 may be withdrawn through an effluent conduit 49 through which flow may be controlled by a valve 51. Thus, the reaction chamber 42 provides for separating through a conduit 52 the natural gas with a reduced carbon dioxide content and the produced solid materials through the effluent conduit 49. The natural gas in conduit 52 is passed through a heat exchanger 53 to cool same to a temperature sufficient that upon its introduction into a high pressure separator 54 any ammonia contained in a natural gas will be condensed to a liquid and withdrawn through an effluent conduit 56. Other means to recover the ammonia from the natural gas may be used, if desired. The ammonia-freed natural gas is passed through a conduit 60 to any suitable utilization, such as to a sales gas pipeline. The ammonia in conduit 56 is recycled to the reaction chamber 42 through a conduit 57, by means of a pump 58. Thus, any ammonia which may be contained in the natural gas freed of carbon dioxide is recovered and recycled. This, of course, provides for an efficient utilization of the ammonia. If desired, the cold stream of ammonia in conduit 57 may be passed through the heat exchanger 46 to cool the ammonia introduced through the conduit 44 into the reaction chamber 42.

As previously mentioned, urea may be separated from the solid materials formed by the reaction of ammonia and carbon dioxide. The urea is, of course, an important organic substance, but it also may be utilized in a manner to further improve the carbon dioxide-freed natural gas. This result may be accomplished by passing the natural gas from one of the process embodiments over crystalline urea at suitable conditions to form crystalline adducts with straight-chain aliphatic compounds of higher molecular weights contained in the natural gas. As this reaction is well known, no detailed explanation of it is felt necessary. Thus, by adjusting the conditions concerning the formation of these crystalline adducts, the heavier molecular weight straight-chain aliphatic compounds such as propane and higher homologs may be separated from the carbon dioxide-freed natural gas and thereafter recovered. Heating the crystalline adducts is one means to permit the recovery of the propane and heavier hydrocarbons which were removed from the natural gas and to restore the urea for further use for removing more of these straight-chain aliphatic compounds. This is, of course, an advantage in providing another use of the solid materials formed by the reaction of ammonia with carbon dioxide by the process of this invention to further improve the commercial acceptabilities of the natural gas.

From the foregoing it will be apparent that there has been provided a process well suited for satisfying all the stated objects of the present invention. Various changes and alterations to the described process may be made by those skilled in the art without departing from the spirit of this invention. It is intended that such alterations and changes be encompassed within the appended claims, and that such claims set forth the only limitations of this invention, and that the foregoing description is to be taken as a means of illustration.

What is claimed is:

1. A process for treating a natural gas stream produced from a subterranean reservoir at high pressure and which gas contains a high concentration of carbon dioxide comprising the steps of:
   (a) intermixing ammonia with the high pressure gas stream,
   (b) contacting the high pressure gas stream and ammonia under reaction conditions such that solid materials including urea are formed by the reaction of ammonia with the carbon dioxide in the gas stream,
   (c) separating the high pressure gas stream with a reduced carbon dioxide content from the resulting solid materials,
   (d) separating urea from said solid materials,
   (e) intermixing urea separated from the solid materials with the separated gas stream,
   (f) contacting the urea and the separated gas stream under reaction conditions such that crystalline adducts of urea with straight-chain aliphatic hydrocarbons having at least three carbon atoms are formed,
   (g) separating the high pressure gas stream with a reduced content of straight-chain aliphatic hydrocarbons from the crystalline adducts, and
   (h) recovering the hydrocarbons from the crystalline adducts.

2. A process for treating a natural gas stream produced from a subterranean reservoir at high pressure and which gas contains a high concentration of carbon dioxide comprising the steps of:
   (a) intermixing ammonia with the high pressure gas stream,
   (b) contacting the high pressure gas stream and ammonia under reaction conditions such that solid materials including urea are formed by the reaction of ammonia with the carbon dioxide in the gas stream,
   (c) separating the high pressure gas stream with a reduced carbon dioxide content from the resulting solid materials,
   (d) separating urea from said solid materials,
   (e) cooling the separated high pressure gas stream to liquefy any ammonia present in the separated gas stream,
   (f) separating the liquefied ammonia from the gas stream,
   (g) intermixing the urea separated from the solid materials with the separated gas stream,
   (h) contacting the urea and the separated gas stream under reaction conditions such that crystalline adducts of urea with straight-chain aliphatic hydrocarbons having at least three carbon atoms are formed,
   (i) separating the high pressure gas stream from the crystalline adducts, and
   (j) recovering the hydrocarbons from the crystalline adducts.

3. A process for treating a natural gas stream produced from a subterranean reservoir at high pressure and which gas contains a high concentration of carbon dioxide comprising the steps of:
   (a) intermixing ammonia with the high pressure natural gas in a molar amount at least equal to thrice the molar amount of carbon dioxide present in the gas stream,
   (b) contacting the natural gas with the ammonia under reaction condition such that solid materials including ammonium carbamate are formed by the reaction of ammonia with the carbon dioxide in the gas stream, and adjusting the reaction conditions to include elevated pressures of such value that the total partial pressure of the ammonia and the carbon dioxide exceeds the dissociation pressure of ammonium carbamate at the said reaction conditions, and an elevated temperature of at least 130° C.,
   (c) separating the high pressure natural gas stream with a reduced carbon dioxide content from the solid materials,
   (d) cooling the separated high pressure gas stream to liquefy ammonia present in said stream,
   (e) separating the liquefied ammonia from the gas stream, and
   (f) recovering the natural gas stream with a reduced carbon dioxide content.

4. The process of claim 3 wherein said solid materials also include urea, and said urea is separated from the solid materials, and the natural gas stream from step (f) is intermixed with the urea, and contacted therewith under reaction conditions such that crystalline adducts with straight-chain aliphatic hydrocarbons having at least three carbon atoms are formed, and then separating the high pressure natural gas stream from the crystalline adducts and recovering the hydrocarbons from said adducts.

References Cited by the Examiner

UNITED STATES PATENTS

| | | | |
|---|---|---|---|
| 1,774,633 | 9/1930 | Bronn et al. | 23—3 |
| 2,681,904 | 6/1954 | Hyer et al. | 260—96.5 X |
| 2,878,099 | 3/1959 | Breuing et al. | 23—3 X |
| 2,966,392 | 12/1960 | Braconier et al. | 23—3 |
| 2,997,366 | 8/1961 | Owens et al. | 23—3 |

MORRIS O. WOLK, *Primary Examiner.*

JOSEPH SCOVRONEK, *Examiner.*